United States Patent [19]
Saito

[11] Patent Number: 5,987,314
[45] Date of Patent: Nov. 16, 1999

[54] RADIO COMMUNICATION APPARATUS HAVING A HIGH RECEIVING SENSITIVITY

[75] Inventor: Atsushi Saito, Tokyo, Japan

[73] Assignee: NEC Corporation, Tokyo, Japan

[21] Appl. No.: 08/878,535

[22] Filed: Jun. 19, 1997

[30] Foreign Application Priority Data

Jun. 21, 1996 [JP] Japan .................................. 8-161534

[51] Int. Cl.⁶ .................................................. H04B 1/38
[52] U.S. Cl. ...................... 455/226.1; 455/67.4; 455/115; 455/254; 455/340
[58] Field of Search .................................. 455/67.4, 67.6, 455/70, 77, 115, 226.1, 226.4, 307, 340, 423, 424, 425, 266, 254; 333/17.3, 32; 375/221

[56] References Cited

U.S. PATENT DOCUMENTS

| | | | |
|---|---|---|---|
| 5,023,941 | 6/1991 | Trumpff et al. | 455/307 |
| 5,216,392 | 6/1993 | Fraser et al. | 455/340 |
| 5,313,656 | 5/1994 | Vaisanen et al. | 455/67.4 |
| 5,481,186 | 1/1996 | Heutmaker et al. | 455/67.4 |
| 5,822,687 | 10/1998 | Bickley et al. | 455/226.1 |
| 5,870,428 | 2/1999 | Miller et al. | 375/221 |

FOREIGN PATENT DOCUMENTS

| | | |
|---|---|---|
| 25 38 349 A1 | 3/1976 | Germany . |
| 195 09 260 A1 | 9/1995 | Germany . |
| 195 09 567 A1 | 10/1995 | Germany . |
| 2-25128 | 1/1990 | Japan ............................. 455/67.4 |
| 6-283967 | 10/1994 | Japan . |

*Primary Examiner*—Nguyen Vo
*Assistant Examiner*—Lester G. Kincaid
*Attorney, Agent, or Firm*—Sughrue, Mion, Zinn, Macpeak & Seas

[57] ABSTRACT

A radio communication apparatus uses an intermediate frequency section to convert a signal from a receiver into an intermediate frequency signal. The intermediate frequency signal is filtered in a filter section, and then demodulated. Matching circuits with variable circuit constants connect the filter section with the intermediate frequency section and the demodulator. A control section supplies a transmitter with an input signal which is then transmitted to the receiver, converted to an intermediate frequency, filtered, and demodulated. The control section adjusts the variable circuit constants in accordance with the input signal and the demodulated signal. Thus, inappropriate circuit constants are adjusted so that the radio apparatus has a high receiving sensitivity without a mismatch.

17 Claims, 3 Drawing Sheets

RADIO COMMUNICATION APPARATUS HAVING A HIGH RECEIVING SENSITIVITY

BACKGROUND OF THE INVENTION

This invention relates to a radio communication apparatus having a reception intermediate frequency filter.

In general, a radio communication apparatus using a digital modulation method comprises a reception section having a reception intermediate frequency (IF) filter section. The reception section receives a transmission signal as a reception signal which is transmitted from an additional radio communication apparatus. Furthermore, the reception section comprises an IF section and a demodulating section. The IF section is for converting the transmission signal into an IF signal. The IF signal is filtered into a filtered IF signal by the IF filter section in order to remove a noise from the IF signal. The demodulating section demodulates the filtered IF signal into a demodulated signal.

The IF filter section comprises a reception IF filter and a matching section. The matching section is for use in matching the IF filter to the IF section and the demodulating section.

The matching section has a matched impedance which will be called a circuit constant. Dispersion inevitably occurs in the circuit constant under manufacturing. Similarly, dispersion inevitably occurs in the filter characteristic of the reception IF filter under manufacturing. Furthermore, each of the circuit constant and the filter characteristic may vary on the basis of an ambient temperature.

The IF filter may not match to the IF section and/or the demodulating section on the basis of the variation of the circuit constant and/or the filter characteristic. When such a mismatch occurs in a conventional radio communication apparatus, a receiving sensitivity reduces in the conventional radio communication apparatus. Namely, it is difficult to obtain a high receiving sensitivity in the conventional radio communication apparatus.

SUMMARY OF THE INVENTION

It is therefore an object of this invention to provide a radio communication apparatus having a high receiving sensitivity without a mismatch.

On describing the gist of this invention, it is possible to understand that a radio communication apparatus comprises a transmission section for carrying out a transmission and a reception section for carrying out a reception. The reception section is for receiving a transmission signal as a reception signal to demodulate the reception signal into a demodulated signal and comprises an intermediate frequency section for converting said reception signal into an intermediate frequency signal, an intermediate filter section for filtering the intermediate frequency signal into a filtered signal, and a demodulating section for demodulating the filtered signal into the demodulated signal. The intermediate frequency filter section comprises an intermediate frequency filter for filtering the intermediate frequency signal into the filtered signal and a matching section for matching each of the intermediate frequency section and the demodulating section to the intermediate frequency filter.

According to this invention, the matching section has a variable circuit constant. The radio communication apparatus comprises connecting means for connecting the transmission section to the reception section and supplying means for supplying the transmission section to an input signal to make the transmission section produce the transmission signal in accordance with the input signal. The supplying means adjusts the variable circuit constant in accordance with the input signal and the demodulated signal.

DESCRIPTION OF THE PREFERRED EMBODIMENT

Figure 1:
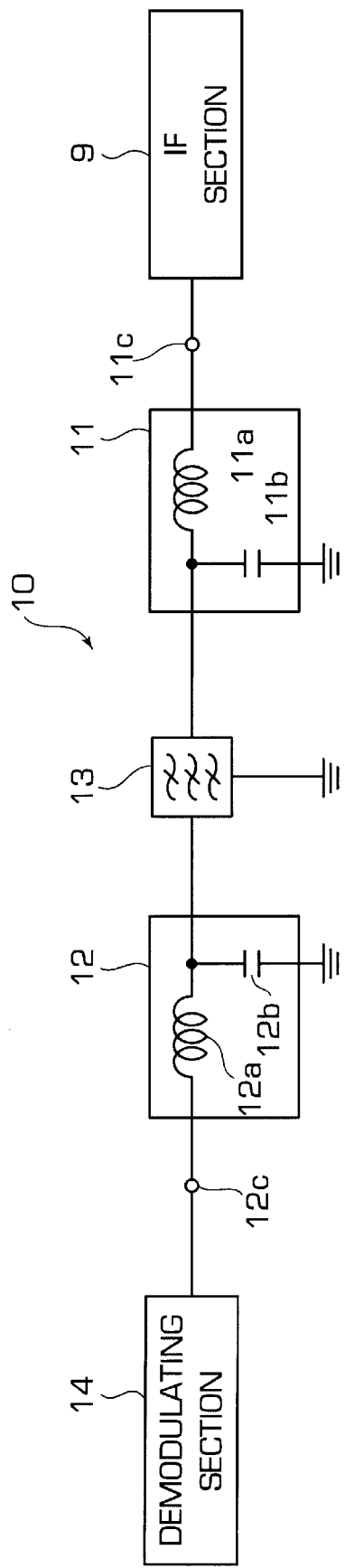
FIG. 1 is a circuit diagram of a reception intermediate filter section for use in a conventional radio communication apparatus.

Referring to FIG. 1, description will made as regards a conventional radio communication apparatus for a better understanding of this invention. The radio communication apparatus comprises a reception section having a reception intermediate frequency (IF) filter section 10 illustrated in FIG. 1. The reception section further comprises an IF section 9 and a demodulating section 14. The IF section receives a transmission signal as a reception signal to convert the reception signal into an IF signal. The IF signal is filtered into a filtered IF signal by the reception IF filter section in order to removing a noise from the IF signal. The demodulating section demodulates the filtered IF signal into a demodulated signal.

The reception IF filter section 10 comprises first and second matching circuits 11 and 12 and an IF filter 13. The IF filter 13 is located between the first matching circuit 11 and the second matching circuit 12. The first and the second matching circuits 11 and 12 are connected to the IF section and the demodulating section, respectively.

The first matching circuit 11 is for matching the IF filter 13 to the IF section. The first matching circuit 11 comprises a coil (inductor) 11a and a condenser (capacitor) 11b which is grounded. The condenser 11b is connected to the coil 11a in parallel. The coil 11a is connected to the IF filter 13 and an input terminal 11c which is connected to the IF section.

The second matching circuit 12 is for matching IF filter 13 to the demodulating section. The second matching circuit 12 comprises a coil (inductor) 12a and a condenser (capacitor) 12b which is grounded. The condenser 12b is connected to the coil 12a in parallel. The coil 12a is connected to the IF filter 13 and an output terminal 12c which is connected to the demodulating section.

By the way, each of the first and the second matching circuits 11 and 12 has a matched impedance which will be called a circuit constant. Dispersion inevitably occurs in the circuit constant under manufacturing. Similarly, dispersion inevitably occurs in the filter characteristic of the IF filter under manufacturing. Furthermore, each of the circuit constant and the filter characteristic may vary on the basis of an ambient temperature.

Mismatch occurs between the IF filter and the IF section on the basis of variation of the circuit constant and/or the filter characteristic. Similarly, mismatch occurs between the IF filter and the demodulating section on the basis of variation of the circuit constant and/or the filter characteristic. When such a mismatch occurs in the conventional radio communication apparatus, a receiving sensitivity reduces in the conventional radio communication apparatus. Namely, it is difficult to obtain a high receiving sensitivity in the conventional radio communication apparatus.

Figure 2:
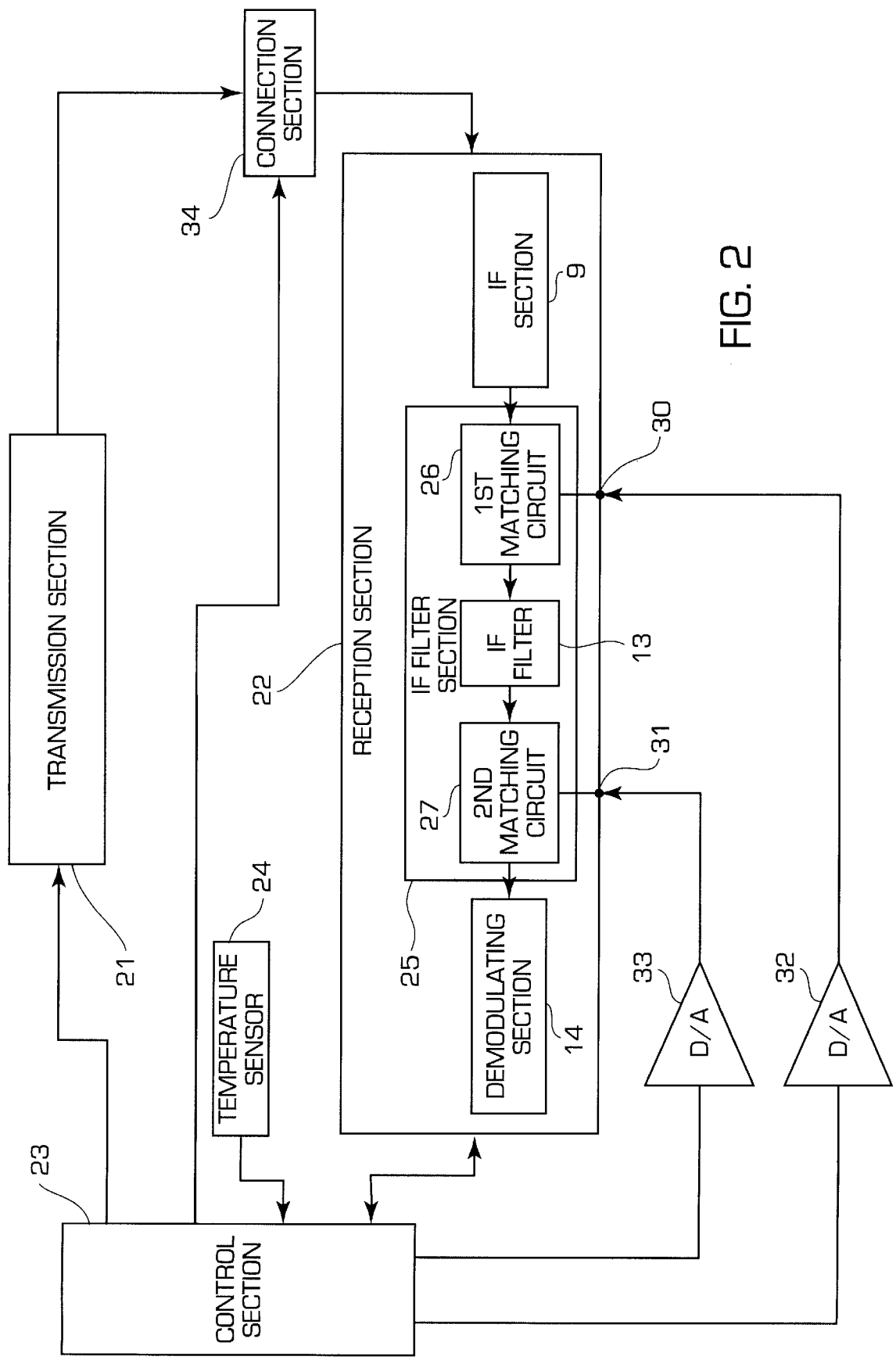
FIG. 2 is a block diagram of a radio communication apparatus according to a preferred embodiment of this invention.

Referring to FIG. 2, description will proceed to a radio communication apparatus according to a preferred embodiment of this invention. The illustrated radio communication apparatus comprises a transmission section 21, a reception section 22, and a control section 23 which controls the transmission section 21 and the reception section 22. The transmission section 21 transmits a transmission signal to an additional radio communication apparatus. The reception section 22 receives, as a reception signal, an additional transmission signal which is transmitted from the additional radio communication apparatus. The radio communication apparatus further comprises a temperature sensor 24 which is connected to the control section 23.

The reception section 22 comprises an intermediate frequency (IF) filter section 25. The IF filter section 25 comprises an IF filter 13. The IF filter section 25 further comprises first and second matching circuits which are different in structure from the first and the second matching circuits illustrated in FIG. 1 and which are designated by reference numerals 26 and 27. The first and the second matching circuits 26 and 27 have first and second circuit constants, respectively. The first circuit constant may be equal to the second circuit constant. Each of the first and the second circuit constants is variable under control of the control section 23. Each of the first and the second circuit constants may be called a matched impedance.

The reception section further comprises an IF section 9 and a demodulating section 14. The IF section is supplied with the reception signal to convert the reception signal into an IF signal which is supplied to the IF filter section 25. The IF filter section 25 filters the IF signal into a filtered IF signal as will be described later. The filtered IF signal is supplied to the demodulating section to be demodulated into a demodulated signal by the demodulating section.

Figure 3:
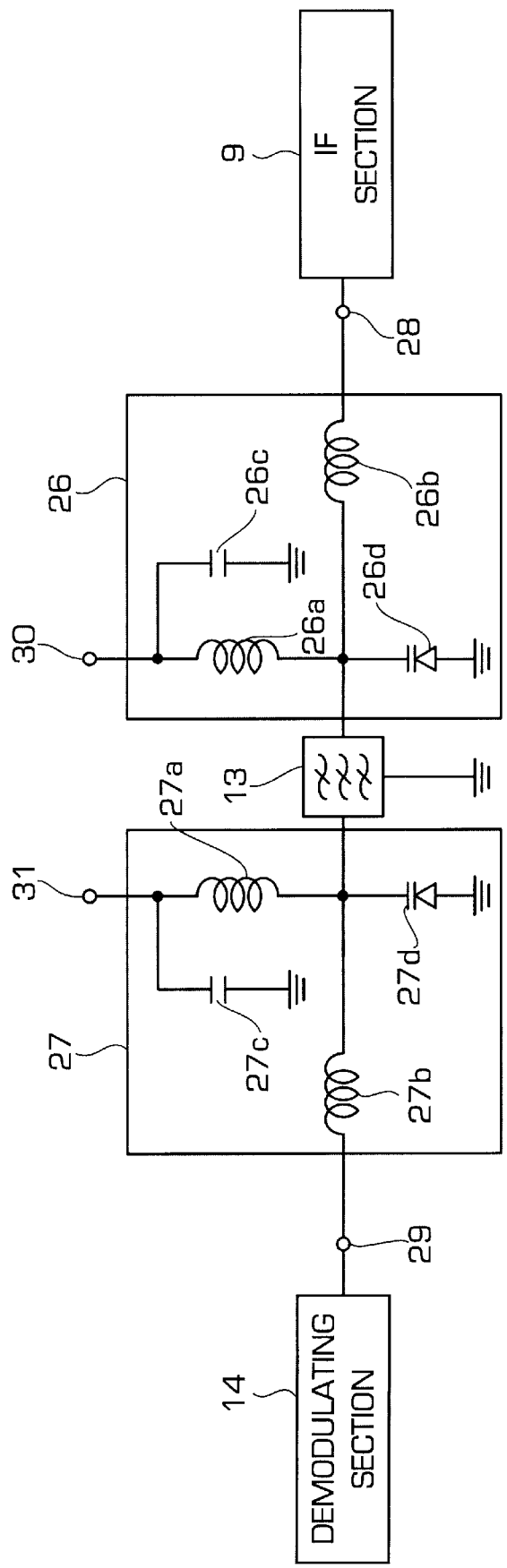
FIG. 3 is a circuit diagram of a reception intermediate filter section for use in the radio communication apparatus illustrated in FIG. 2.

Referring to FIG. 3, the IF filter 13 is located between the first matching circuit 26 and the second matching circuit 27. More particularly, the first matching circuit 26 is connected to the IF filter 13 and an input terminal 28 which is connected to the IF section. The second matching circuit 27 is connected to the IF filter 13 and an output terminal 29 which is connected to the demodulating section.

Attention will be directed to the first matching circuit 26. The first matching circuit 26 comprises first and second coils (inductors) 26a and 26b, a condenser (capacitor) 26c, and a varactor diode (varicap diode) 26d. The first coil 26a is connected in parallel to the condenser 26c which is grounded. The first coil 26a is further connected to a first control terminal 30 and the cathode of the varactor diode 26d whose anode is grounded. The IF filter 13 is connected to the first and the second coils 26a and 26b and the cathode of the varactor diode 26d. The second coil 26b is connected to the input terminal 28.

Similarly, the second matching circuit 27 comprises primary and secondary coils (inductors) 27a and 27b, a condenser (capacitor) 27c, and a varactor diode (varicap diode) 27d. The primary coil 27a is connected in parallel to the condenser 27c which is grounded. The primary coil 27a is further connected to a second control terminal 31 and the cathode of the varactor diode 27d whose anode is grounded. The IF filter 13 is connected to the primary and the secondary coils 27a and 27b and the cathode of the varactor diode 27d. The secondary coil 27b is connected to the output terminal 29.

Referring to FIGS. 2 and 3, the control section 23 is connected to the first and second control terminals 30 and 31 through first and second digital-analog (D/A) converters 32 and 33. When an electric power is supplied to the radio communication apparatus, the control section 23 controls a connection section 34 to connect the transmission section 21 to the reception section 22.

At a first step, the control section 23 supplies to the first and the second control terminals 30 and 31 a first voltage which is a predetermined minimum voltage. The control section 23 controls the transmission section 21 and the reception section 22 to make a transmission frequency be equal to a reception frequency. The control section 23 supplies a pseudorandom signal to the transmission section 21. The transmission section 21 modulates the pseudorandom signal into the transmission signal which is supplied as the reception signal to the reception section 22 through connection section 34.

The reception signal is demodulated into the demodulated signal as described above. The demodulated signal is supplied to the control section 23. The control section 23 compares the demodulated signal with the pseudorandom signal to calculate an error ratio as a first error ratio. The control section 23 stores the first error ratio and the first voltage as a stored error ratio and a control voltage, respectively.

At a second step, the control section 23 produces a second voltage which is greater in a predetermined level than the first voltage. The second voltage is supplied from the control section 23 to the first and the second control terminals 30 and 31. The control section 23 supplies the pseudorandom signal to the transmission section 21. The transmission section 21 modulates the pseudorandom signal into the transmission signal which is supplied as the reception signal to the reception section 22 through connection section 34.

The reception signal is demodulated into the demodulated signal as described above. The demodulated signal is supplied to the control section 23. The control section 23 compares the demodulated signal with the pseudorandom signal to calculate an error ratio as a second error ratio.

The control section 23 compares the stored error ratio with the second error ratio. When the second error ratio is less than the stored error ratio, the control section 23 stores the second error ratio and the second voltage as the stored error ratio and the control voltage, respectively.

At an N-th step, the control section 23 produces an N-th voltage which is greater in the predetermined level than a (N–1)-th voltage, where N represents a positive integer which is greater than one. The N-th voltage is equal to a predetermined maximum voltage. The N-th voltage is supplied from the control section 23 to the first and the second control terminals 30 and 31. As described above, the control section 23 supplies the pseudorandom signal to the transmission section 21. As a result, the reception section 22 supplies the demodulated signal to the control section 23. The control section 23 compares the demodulated signal with the pseudorandom signal to calculate an error ratio as an N-th error ratio.

The control section 23 compares the stored error ratio with the N-th error ratio. When the N-th error ratio is less than the stored error ratio, the control section 23 stores the N-th error ratio and the N-th voltage as the stored error ratio and the control voltage, respectively.

As readily understood from the above description, the control section 23 investigates the control voltage at which a minimum error ratio is obtained. More particularly, the control section 23 judges a minimum one of the first through the N-th error ratios to select a selected one of the first through the N-th voltages as the control voltage that corresponds to the minimum error ratio. After the control section 23 disconnects the transmission section 21 from the reception section 22 by the connecting section 34, the control section 23 supplies the selected voltage as the control voltage to the first and the second control terminals 30 and 31.

Again referring to FIGS. 2 and 3, the temperature sensor 24 is connected to the control section 23. The temperature sensor 24 detects an ambient temperature to supply the ambient temperature as a detected temperature to the control section 23. Just after the electric power is supplied to the radio communication apparatus, the control section 23 stores the detected temperature as an initial temperature. The control section 23 adjusts the control voltage as described above before carrying out communication.

The temperature sensor 24 successively detects the ambient temperature to supply the control section 23 the ambient temperature as the detected temperature. When the detected temperature is greater or lower in a predetermined value than the initial temperature, the control section 23 again adjusts the control voltage in order to adjust each of the first and the second circuit constants.

It will be assumed that the control section 23 supplies an initial voltage as the control voltage to the first and the second control terminals 30 and 31.

The control section 23 supplies the first and the second control terminals 30 and 31 with a first adjusted voltage which is greater in the predetermined level than the initial voltage. The control section 23 measures an error ratio as described above. When the error ratio is improved, the control section 23 supplies the first and the second control terminals 30 and 31 with a second adjusted voltage which is greater in the predetermined level than the first adjusted voltage, in order to measure the error ratio in the second adjusted voltage. When the error ratio is again improved, the control section 23 supplies the first and the second control terminals 30 and 31 with a third adjusted voltage which is greater in the predetermined level than the second adjusted voltage, in order to measure the error ratio in the third adjusted voltage.

In a manner described above, the control section 23 supplies the first and the second control terminals 30 and 31 with a K-th adjusted voltage which is greater than in the predetermined level than a (K−1)-th adjusted voltage until the error ratio has not been improved, where K represents a positive integer which is greater than one.

As readily understood from the above description, the control section 23 investigates an adjusted voltage at which a lowest error ratio is obtained. The control section 23 supplies the adjusted voltage as the control voltage to the first and the second control terminals 30 and 31.

When the error ratio is not improved even if the control section 23 makes the control voltage rise, the control section 23 drops the initial voltage. More specifically, the control section 23 supplies the first and the second control terminals 30 and 31 with a first varied voltage which is lower in the predetermined level than the initial voltage. The control section 23 measures an error ratio as a described above. When the error ratio is improved, the control section 23 supplies the first and the second control terminals 30 and 31 with a second varied voltage which is less in the predetermined level than the first varied voltage, in order to measure the error ratio in the second varied voltage. When the error ratio is again improved, the control section 23 supplies the first and the second control terminals 30 and 31 with a third varied voltage which is less in the predetermined level than the second varied voltage, in order to measure the error ratio at the third varied voltage.

In a manner described above, the control section 23 supplies the first and the second control terminals 30 and 31 with a K-th varied voltage which is less than in the predetermined level than a (K−1)-th varied voltage until the error ratio has not been improved.

As readily understood from the above description, the control section 23 investigates a varied voltage at which a lowest error ratio is obtained. The control section 23 supplies the varied voltage as the control voltage to the first and the second control terminals 30 and 31.

Referring to FIGS. 1 and 2, description will be made regarding another example of controlling the control voltage in the radio communication apparatus illustrated in FIG. 1. It will be assumed that phase shift keying is used in the radio communication apparatus. As described above, the control section 23 controls the connection section 34 to connect the transmission section 21 to the reception section 22 on controlling or adjusting the control voltage.

The control section 23 supplies the first and the second control terminals 30 and 31 with the first voltage which is equal to the predetermined minimum voltage. The control section 23 controls the transmission section 21 and the reception section 22 to make the transmission frequency be equal to the reception frequency. The control section 23 supplies the transmission section 21 with the pseudorandom signal having a predetermined length as a transmission phase signal. The transmission section 21 modulates the pseudorandom signal into the transmission signal which is supplied as the reception signal to the reception section 22 through the connection section 34. The reception signal is demodulated into the demodulated signal in the reception section 22 as described above.

The demodulated signal is supplied as a reception phase signal to the control section 23. The control section 23 calculates a phase difference between the reception phase signal and the transmission phase signal at each symbol. The control section 23 calculates an absolute value of each phase difference to obtain a sum of the absolute values as a first absolute sum. The control section 23 stores the first absolute sum and the first voltage as a stored absolute sum and a control voltage, respectively.

The control section 23 produces the second voltage which is greater than in the predetermined level than the first voltage. The second voltage is supplied from the control section 23 to the first and the second control terminals 30 and 31. The control section 23 supplies the transmission phase signal to the transmission section 21. The transmission section 21 modulates the transmission phase signal into the transmission signal which is supplied as the reception signal to the reception section 22 through connection section 34.

The reception signal is demodulated into the reception phase signal as described above. The reception phase signal is supplied to the control section 23. The control section 23 calculates a phase difference between the reception phase signal and the transmission phase signal at each symbol. The control section 23 calculates an absolute value of each phase difference to obtain a sum of the absolute values as a second absolute sum.

The control section 23 compares the stored absolute sum with the second absolute sum. When the second absolute sum is less than the stored absolute sum, the control section 23 stores the second absolute sum and the second voltage as the stored absolute sum and the control voltage, respectively.

The control section 23 produces the N-th voltage which is greater in the predetermined level than the (N−1)-th voltage. The N-th voltage is equal to the predetermined maximum voltage. The N-th voltage is supplied from the control section 23 to the first and the second control terminals 30 and 31.

As described above, the control section 23 supplies the transmission phase signal to the transmission section 21. As a result, the reception section 22 supplies the reception phase signal to the control section 23. The control section 23 calculates an absolute value of each phase difference to obtain a sum of the absolute values as an N-th absolute sum.

The control section 23 compares the stored absolute sum with the N-th absolute sum. When the N-th absolute sum is less than the stored absolute sum, the control section 23 stores the N-th absolute sum and the N-th voltage as the stored absolute sum and the control voltage, respectively.

As readily understood from the above description, the control section 23 investigates the control voltage at which a minimum absolute sum is obtained. More particularly, the control section 23 judges a minimum one of the first through the N-th absolute sum to select a selected one of the first through the N-th voltages as the control voltage that corresponds to the minimum absolute sum. After the control section 23 disconnects the transmission section 21 to the reception section 22 by the connecting section 34, the control section 23 supplies the selected voltage as the control voltage to the first and the second control terminals 30 and 31.

The control section 23 controls the control voltage when the electric power is supplied to the radio communication apparatus. In addition, the control section 23 controls the control voltage on changing the ambient temperature beyond the predetermined value.

As described above, the control section 23 controls the control voltage which is supplied to the first and the second matching circuits 26 and 27. Therefore, mismatch does not occur in the radio communication apparatus inasmuch as each of the first and the second circuit constants is varied so as to minimize an error between the pseudorandom signal and the demodulated signal.

While this invention has thus far been described in conjunction with the preferred embodiment thereof, it will readily be possible for those skilled in the art to put this invention into practice in various other manners.

What is claimed is:

1. A radio communication apparatus comprising a transmission section for carrying out a transmission and a reception section for carrying out a reception, said reception section for receiving a transmission signal as a reception signal to demodulate the reception signal into a demodulated signal and comprising an intermediate frequency section for converting said reception signal into an intermediate frequency signal, an intermediate filter section for filtering said intermediate frequency signal into a filtered signal, and a demodulating section for demodulating said filtered signal into said demodulated signal, said intermediate frequency filter section comprising an intermediate frequency filter for filtering said intermediate frequency signal into said filtered signal and a matching section for matching each of said intermediate frequency section and the demodulating section to said intermediate frequency filter, wherein:

said matching section has a variable circuit constant;

said radio communication apparatus comprising:

connecting means for connecting said transmission section to said reception section; and supplying means for supplying said transmission section with an input signal to make said transmission section produce said transmission signal in accordance with said input signal, said supplying means acting as adjusting means for adjusting said variable circuit constant in accordance with said input signal and said demodulated signal;

said input signal is a pseudorandom input signal; and said adjusting means calculating an error ratio between said pseudorandom signal and said demodulated signal to adjust said variable circuit constant in accordance with said error ratio.

2. A radio communication apparatus as claimed in claim 1, wherein:

said matching section comprises a capacitor device of which capacity is varied on the basis of a controllable voltage; and said adjusting means supplies said controllable voltage to said matching section to minimize said error ratio.

3. A radio communication apparatus as claimed in claim 2, wherein said capacitor device is a varactor diode.

4. A radio communication apparatus as claimed in claim 1, wherein:

said pseudorandom input signal has a predetermined length; and said adjusting means calculating an error ratio between said pseudorandom signal and said demodulated signal to adjust said variable circuit constant in accordance with said error ratio.

5. A radio communication apparatus as claimed in claim 4, wherein:

said matching section comprises a capacitor device of which capacity is varied on the basis of a controllable voltage; and said control section supplies said controllable voltage to said matching section to minimize said phase difference.

6. A radio communication apparatus as claimed in claim 5, wherein said capacitor device is a varactor diode.

7. A radio communication apparatus as claimed in claim 1, wherein each of said connecting means, said supplying means, and said adjusting means is put into operation when an electric power is supplied to said radio communication apparatus.

8. A radio communication apparatus as claimed in claim 1, wherein:

said radio communication apparatus further comprises a temperature detecting means for detecting an ambient temperature of said intermediate frequency filter section as a detected temperature of said intermediate frequency filter section as a detected temperature; and each of said connector and said control section is put into operation when said detected temperature varies beyond a predetermined value.

9. A radio communication apparatus comprising a transmission section for carrying out a transmission and a reception section for carrying out a reception, said reception section for receiving a transmission signal as a reception signal to demodulate the reception signal into a demodulated signal and comprising an intermediate frequency section for converting said reception signal into an intermediate frequency signal, an intermediate filter section for filtering said intermediate frequency signal into a filtered signal, and a demodulating section for demodulating said filtered signal into said demodulated signal, said intermediate frequency filter section comprising an intermediate frequency filter for filtering said intermediate frequency signal into said filtered signal, and a matching section for matching each of said intermediate frequency section and the demodulating section to said intermediate frequency filter, wherein:

said matching section has a variable circuit constant;

said radio communication apparatus further comprising:

a connector for connecting said transmission section to said reception section; and a control section for supplying said transmission section with an input signal to make said transmission section produce said transmission signal in accordance with said input signal, and also for adjusting said variable circuit constant in accordance with said input signal and said demodulated signal.

10. A radio communication apparatus as claimed in claim 9, wherein:

said input signal is a pseudorandom signal; and said control section calculating an error ratio between said pseudorandom signal and said demodulated signal to adjust said variable circuit constant in accordance with said error ratio.

11. A radio communication apparatus as claimed in claim 10, wherein:

said matching section comprises a capacitor device of which capacity is varied on the basis of a controllable voltage; and said control section supplies said controllable voltage to said matching section to minimize said error ratio.

12. A radio communication apparatus as claimed in claim 11, wherein:

said capacitor device is a varactor diode.

13. A radio communication apparatus as claimed in claim 9, wherein:

said input signal is a pseudorandom signal having a predetermined length; and said control section calculating a phase difference between said pseudorandom signal and said demodulated signal at each symbol to obtain an absolute sum of the phase differences, said control section adjusting said variable circuit constant in accordance with said absolute sum.

14. A radio communication apparatus as claimed in claim 13, wherein:

said matching section comprises a capacitor device of which capacity is varied on the basis of a controllable voltage; and said control section supplies said controllable voltage to said matching section to minimize said error ratio.

15. A radio communication apparatus as claimed in claim 14, wherein:

said capacitor device is a varactor diode.

16. A radio communication apparatus as claimed in claim 9, wherein each of said connector and said control section is put into operation when an electric power is supplied to said radio communication apparatus.

17. A radio communication apparatus as claimed in claim 9, wherein:

said radio communication apparatus further comprises a temperature detecting means for detecting an ambient temperature of said intermediate frequency filter section as a detected temperature of said intermediate frequency filter section as a detected temperature; and each of said connector and said control section is put into operation when said detected temperature varies beyond a predetermined value.

* * * * *